(12) United States Patent
Shea et al.

(10) Patent No.: US 7,145,757 B2
(45) Date of Patent: Dec. 5, 2006

(54) SYSTEM FOR ELIMINATING ARCING FAULTS AND POWER DISTRIBUTION SYSTEM EMPLOYING THE SAME

(75) Inventors: John J. Shea, Pittsburgh, PA (US); Robert N. Parry, Beaver, PA (US)

(73) Assignee: Eaton Corporation, Cleveland, OH (US)

( * ) Notice: Subject to any disclaimer, the term of this patent is extended or adjusted under 35 U.S.C. 154(b) by 404 days.

(21) Appl. No.: 10/756,646

(22) Filed: Jan. 13, 2004

(65) Prior Publication Data

US 2005/0152078 A1 Jul. 14, 2005

(51) Int. Cl.
*H02H 3/00* (2006.01)
*H02H 7/00* (2006.01)

(52) U.S. Cl. .................. 361/2; 361/8; 361/3; 361/9; 361/10

(58) Field of Classification Search .................. 361/8, 361/2, 3, 9, 10
See application file for complete search history.

(56) References Cited

U.S. PATENT DOCUMENTS

| | | | |
|---|---|---|---|
| 3,737,724 A * | 6/1973 | Salge et al. ............... | 361/8 |
| 4,339,638 A | 7/1982 | Lascelles et al. | |
| 4,433,607 A | 2/1984 | Kemeny | |
| 5,510,946 A | 4/1996 | Franklin | |
| 5,903,427 A | 5/1999 | Roby | |
| 5,933,308 A | 8/1999 | Garzon | |
| 5,940,547 A | 8/1999 | Schumacher et al. | |
| 6,084,756 A | 7/2000 | Doring et al. | |
| 6,140,715 A | 10/2000 | Bernhoff et al. | |
| 6,141,192 A | 10/2000 | Garzon | |
| 6,229,680 B1 | 5/2001 | Shea | |
| 6,239,514 B1 | 5/2001 | Isberg et al. | |
| 6,535,369 B1 | 3/2003 | Redding et al. | |
| 6,633,009 B1 | 10/2003 | Shea | |
| 6,657,150 B1 | 12/2003 | Shea et al. | |

FOREIGN PATENT DOCUMENTS

JP 409139159 A * 5/1997

OTHER PUBLICATIONS

Klockner-Moeller Ltd., ARCON, "Arc Fault Detection and Quenching System", 6 pgs, no date.
UTU, "UTU Arc Protection Systems—a possibility to be protected", 4 pgs., Ulvila, Finland, no date.
Garzon, R. "Arc Terminator An Alternative to Arc-Proofing", pp. 1-5, Square "D" Company, Smyma, TN, no date.

(Continued)

*Primary Examiner*—Brian Sircus
*Assistant Examiner*—Zeev Kitov
(74) *Attorney, Agent, or Firm*—Martin J. Moran

(57) ABSTRACT

A shorting system, which eliminates persistent arcing faults in power distribution equipment, includes a first shorting switch having separable contacts, an actuation input and a fuse electrically connected in series with those contacts. A second shorting switch includes an actuation input and separable contacts, which are electrically connected in parallel with the series combination of the fuse and the first shorting switch contacts. A detection circuit includes one or more arcing light sensors and an actuation circuit. The light sensors detect arcing fault light and the actuation circuit responsively outputs a first trigger signal to the first shorting switch actuation input to close its contacts. For a persistent arcing fault, which is not eliminated by the first shorting switch, a predetermined time after the first trigger signal, the actuation circuit responsively outputs a second trigger signal to the second shorting switch actuation input to close its contacts.

22 Claims, 4 Drawing Sheets

OTHER PUBLICATIONS

Square D Schneider Electric, "Arc-Terminator—Medium voltage arc-detection and arc-termination device", Power 2000, 9 pgs.

ABB Power Distribution, "ArcEliminator Rapid Elimination of Internal Arcing", 4 pgs., Arboga, Sweden, no date.

Siemens, "Pressure Switch System 8AX10 For Medium Voltage Switchgear", 1 pg., no date.

Berger, F. et al., "Kurzschlieber mit Gasgeneratorantrieb fur Storlichtbogenschutz", 4 pgs., 1999, Federal Republic of Germany.

RISI, "EBW Cable Cutter", 1 pg., San Ramon, CA, no date.

RISI, "Technical Discussion on Explosives", 14 pgs., no date.

* cited by examiner

SYSTEM FOR ELIMINATING ARCING FAULTS AND POWER DISTRIBUTION SYSTEM EMPLOYING THE SAME

BACKGROUND OF THE INVENTION

1. Field of the Invention

The present invention relates to systems for eliminating arcing faults at components of electric power systems and, more particularly, to such systems for detecting and eliminating arcing faults within the metal cabinets of switchgear. The invention also relates to power distribution systems employing shorting switches for eliminating arcing faults.

2. Background Information

Electric power systems incorporate switches for control and protection purposes. Distribution systems, which form part of the overall electric power system, include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within switchgear cabinets, such as between power buses, or between a power bus and a grounded metal component. Such arcing faults can produce high energy gases, which pose a threat to the structure and nearby personnel. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

A common approach to protecting personnel from arcing faults in switchgear has been to design the metal enclosures to withstand the blast from the arcing fault. This has been done at great additional costs due to the heavy gauge metal used and numerous weld joints needed to prevent flying debris. Even with these precautions, the blast from an arcing fault inside the switchgear cannot be contained.

Recently, methods have been developed to minimize the severity of the blast from an internal arcing fault. These methods include pressure sensing and light detection, which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage.

In a medium voltage system, an internal arcing fault would occur somewhere inside of the switchgear enclosure, frequently, but certainly not limited to the point where the cables servicing the load are connected.

In a low voltage system, such as, for example, a motor control center, an internal arcing fault could occur within the load center panelboard when, for example, servicing line panelboards. A bare live copper bus could inadvertently be shorted. Another example for both low and medium voltage systems would be the shorting of the conductors by rodents, snakes, or other animals or objects.

In the low voltage system, the arcing fault could clear itself, by burning or ejecting the short, but it may take more than one-half cycle to do so, thereby causing significant damage and great risk of injury to workers even in one-half cycle of arcing. Thus, the need for a sub-one-half cycle high-speed switch.

A medium voltage system would behave similar to the low voltage system; however, the medium voltage system would be less likely to be self-extinguishing. The crowbarring of the shorting switch will extinguish the arc. Once the arc is out, and if the short has been burned away or removed, then system power can be restored.

It is known to employ a high-speed shorting switch to eliminate an arcing fault. Known arc elimination devices and systems produce a bolted fault across the power bus (e.g., phase to phase, such as two switches for three phases; phase to ground, such as three switches for three phases), in order to eliminate the arcing fault and prevent equipment damage and personnel injury due to arc blasts. It is also known to employ various types of crowbar switches for this purpose. The resulting short on the power bus causes an upstream circuit breaker to clear the bolted fault by removing power. See, for example, U.S. Pat. Nos. 6,633,009; and 6,657,150. As a result, system power is lost due to the tripping of the upstream circuit breaker.

Such arc elimination devices and systems may be applied in low voltage (e.g., up to about 690 VAC) and/or medium voltage (e.g., about 1 kV to about 38 kV) applications. For example, FIG. 1 shows medium voltage (e.g., 15 kV/60 MVA with a 50 kA fault potential) switchgear 2 for a three-phase power source 4. Associated with a three-phase power bus 6 is a first shorting switch 8, which is disposed between phases A and B, and a second shorting switch 10, which is disposed between phases B and C. Although the three-phase switchgear 2 and power source 4 are shown, one of the shorting switches 8,10 may be applied in a single-phase application (not shown). Although phase to phase shorting switches 8,10 are shown, such shorting switches may be applied from phase to ground 12. Disposed within the switchgear 2 are a plurality of light sensors 14,16,18,20, which detect the presence of arc light 22 associated with an arcing fault 24. In response to the arcing fault 24, one or more of the sensors 14,16,18,20 detect and communicate the presence of the arc light 22 to a trigger/power circuit 26, which responsively sends an actuation signal 28 to one or both of the shorting switches 8,10.

Shorting switches, however, shut down the system fed by the associated switchgear. Loss of power, even for a few seconds, can be devastating for critical loads (e.g., relatively large motors) and critical processes or operations (e.g., power plants; petrochemical plants; emergency backup paper mills).

There is a need, therefore, for improved apparatus and method for detecting and clearing arcing faults in electric power systems and, particularly, within switchgear.

Accordingly, there is room for improvement in systems for eliminating arcing faults and in power distribution systems employing shorting systems.

SUMMARY OF THE INVENTION

These needs and others are met by the present invention, which clears the bolted fault of a first shorting switch, thereby allowing power circuit power to be restored. This allows the initial arcing fault to clear. If, however, the arcing fault persists and does not clear within the predetermined time, then a second shorting switch closes to protect the power circuit from the arcing fault. The clearing time is determined by the interruption properties, for example, of a fuse placed in series with the first shorting switch that produced the bolted fault. Generally, an internal arcing fault may blow itself clear after arcing. After the fuse clears, the power circuit voltage is restored if the arcing fault cleared. Otherwise, the second shorting switch closes to prevent further arcing and, thus, shut down power to the power circuit.

In accordance with one aspect of the invention, a system for eliminating an arcing fault of power distribution equipment comprises: a first switch including a first input; a circuit interrupter electrically connected in series with the first switch; a second switch including a second input, the second switch being electrically connected in parallel with the series combination of the first switch and the circuit interrupter; and a circuit adapted to detect the arcing fault and responsively output a first signal to the first input of the first switch to close the first switch and, also, responsively output after a predetermined time a second signal to the second input of the second switch to close the second switch.

The first switch and the second switch may be shorting switches each of which comprises separable contacts and an operating mechanism including a closed state. One of the first input and the second input may actuate the operating mechanism and move the operating mechanism to the closed state.

The arcing fault may persist for greater than the predetermined time or be temporarily eliminated by the first switch before reoccurring before the predetermined time.

The circuit interrupter may include a closed state and an open state. The first switch may be adapted to close in order to eliminate the arcing fault when the circuit interrupter is in the closed state. The arcing fault may be a persistent arcing fault. The second switch may be adapted to close to eliminate the persistent arcing fault after the circuit interrupter is in the open state and after the predetermined time.

As another aspect of the invention, a shorting system for eliminating an arcing fault between a first conductor and a second conductor of a power distribution system comprises: a first shorting switch comprising first separable contacts, a first operating mechanism and a first input to actuate the first operating mechanism to close the first separable contacts; a fuse electrically connected in series with the first separable contacts of the first shorting switch; a second shorting switch comprising second separable contacts, a second operating mechanism and a second input to actuate the second operating mechanism to close the second separable contacts, the second separable contacts being electrically connected in parallel with the series combination of the first separable contacts and the fuse, the parallel combination of the second separable contacts and the series combination of the first separable contacts and the fuse being adapted for electrical connection between the first and second conductors of the power distribution system; and a circuit adapted to detect the arcing fault and responsively output a first signal to the first input of the first shorting switch to close the first shorting switch and, also, responsively output after a predetermined time a second signal to the second input of the second shorting switch to close the second shorting switch.

The power distribution system may include alternating current power having a line cycle period associated with at least one of the first and second conductors. The predetermined time may be about one-half to about two times the line cycle period.

The circuit may include an arcing light detector having an output and also may include an actuator having an input for the output of the arcing light detector and an output providing the first signal to the first input of the first shorting switch.

The circuit may include an arcing light detector having an output with a third signal, a time delay having an input for the output of the arcing light detector and an output responsive to the third signal after the predetermined time, an AND gate including a first input, which is electrically connected to the input of the time delay, a second input, which is electrically connected to the output of the time delay, and an output, and an actuator having an input for the output of time delay and an output providing the second signal to the second input of the second shorting switch.

The circuit may include a display displaying that the first separable contacts of the first shorting switch are closed. The circuit may include a display displaying that the second separable contacts of the second shorting switch are closed.

As another aspect of the invention, a power distribution system comprises: a first conductor; a second conductor; a shorting system for eliminating an arcing fault between the first conductor and the second conductor, the shorting system comprising: a first shorting switch including a first input, a circuit interrupter electrically connected in series with the first shorting switch, a second shorting switch including a second input, the second shorting switch being electrically connected in parallel with the series combination of the first shorting switch and the circuit interrupter, and a circuit adapted to detect the arcing fault and responsively output a first signal to the first input of the first shorting switch to close the first shorting switch and, also, responsively output after a predetermined time a second signal to the second input of the second shorting switch to close the second shorting switch.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 2:
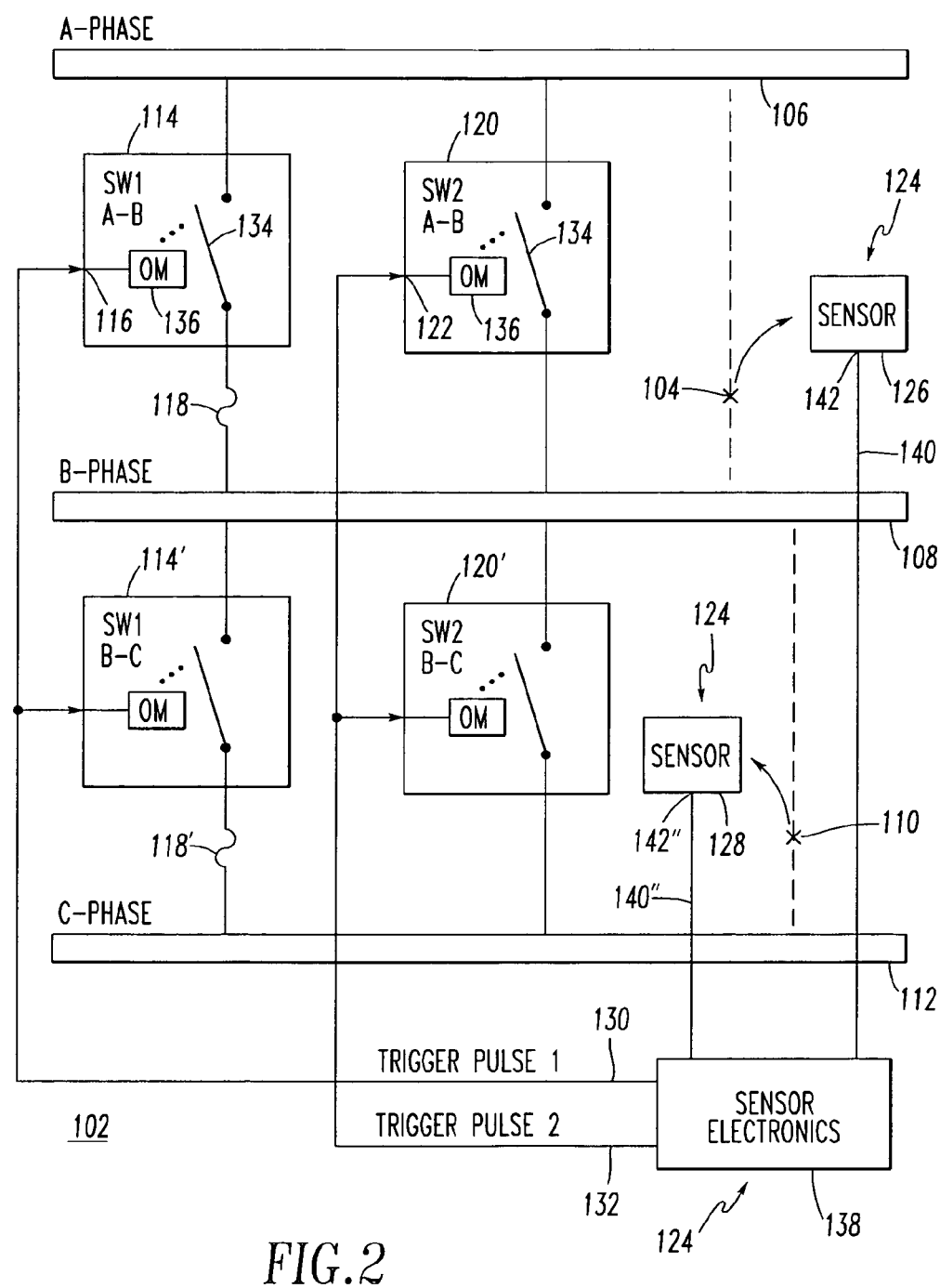
FIG. 2 is a block diagram of an arcing fault light sensor and shorting switch configuration in accordance with the present invention.

Referring to FIG. 2, an arcing fault light sensor and shorting switch system 102 is shown. This system 102 eliminates an arcing fault, such as, for example, fault 104 between A-phase conductor 106 and B-phase conductor 108, or fault 110 between B-phase conductor 108 and C-phase conductor 112 of a power distribution system or power distribution equipment (not shown). For the conductors 106,108, the system 102 includes a first switch 114 having a first input 116, a circuit interrupter, such as fuse 118, electrically connected in series with the first switch 114, a second switch 120 having a second input 122, and a detection circuit 124. The second switch 120 is electrically connected in parallel with the series combination of the first switch 114 and the fuse 118. The detection circuit 124 includes one or more sensors, such as 126,128, adapted to detect the one or more arcing faults, such as 104,110, respectively, and responsively output a first signal 130 to the first switch input 116 to close the switch 114 and, also, responsively output, after a predetermined time, a second signal 132 to the second switch input 122 to close the switch 120.

As shown with the first switch (SW1 A-B) 114, the switches 114,120 include separable contacts 134 and an operating mechanism (OM) 136, which is actuated by the corresponding input 116 to close the separable contacts 134. In turn, the fuse 118 is electrically connected in series with the separable contacts 134 of the first switch 114. The separable contacts 134 of the second switch 120 are electrically connected in parallel with the series combination of the separable contacts 134 of the first switch 114 and the fuse 118. In other words, the separable contacts 134 of the second switch 120 are electrically connected between the conductors 106,108. Hence, the parallel combination of the separable contacts 134 of the second switch 120 and the series combination of the separable contacts 134 of the first switch 114 and the fuse 118 are adapted for electrical connection between the conductors 106,108.

The detection circuit 124 is adapted to detect the arcing fault 104 through the sensor 126 and responsively output the first signal 130 (trigger pulse 1) to the first switch input 116 to close the first shorting switch 114 and, also, responsively output, after the predetermined time, the second signal 132 (trigger pulse 2) to the second switch input 122 to close the second shorting switch 120.

For example, each of the conductors 106,108,112 may be a low voltage alternating current power bus having a frequency (e.g., 50 Hz; 60 Hz; 400 Hz) with a corresponding line cycle period. As a further example, for a 50 Hz or 60 Hz power distribution system, the predetermined time of the detection circuit 124 may be about one-half to about two times the corresponding line cycle period.

In the system 102, in response to the arcing fault 104, the detection circuit 124 outputs the first signal 130, which causes the first shorting switch 114 to close. The first shorting switch 114 is adapted to close in order to eliminate the arcing fault 104 when the fuse 118 is in its closed state. Normally, the first shorting switch 114 will clear the arcing fault 104 after which the fuse 118 clears the first shorting switch 114. By placing a suitable clearing fuse, such as 118, in series with the first shorting switch 114, the resulting bolted fault can be removed after a suitable time. This time may be, for example, on the order of about one-half line cycle. This is a sufficient time for the fault-causing material (not shown) to burn and/or blow free of the power buses 106,108, but not too long to upset critical loads.

EXAMPLE

For an example 15 KV circuit with a 50 KA fault potential, a typical fuse marketed by Eaton Electrical, Inc. of Pittsburgh, Pa., would be a 15CLE-300E fuse. In this circuit, the clearing time would be about ¼ cycle, but this is only a typical value, as fault potential and fault circuit impedances are quite variable.

The second shorting switch 120 is adapted to close to eliminate a persistent arcing fault after the fuse 118 is in its open state and after the predetermined time. Hence, if the arcing fault 104 persists (e.g., for greater than the predetermined time; is temporarily eliminated by the first shorting switch 114 before reoccurring before the predetermined time) after the fuse 118 clears the first shorting switch 114, then in response to the persistent arcing fault 104, the detection circuit 124 outputs the second signal 132, which causes the second shorting switch 120 to close. The second shorting switch 120, which does not employ a fuse, provides the necessary safety backup if, upon fuse clearing, the arcing fault 104 is persistent.

Although one sensor 126, which is adapted to detect arc light from the arcing fault 104, is shown for the conductors 106,108, a plurality of sensors (not shown) may be employed. For example, a second set of arcing fault light sensors (not shown) may also be employed as a backup for the second shorting switch 120. Alternatively, the original light sensors, such as 126, may also pick up the light from the reinitiated arcing fault for both of the switches 114,120.

In a similar manner, for the conductors 108,112, the system 102 includes a first shorting switch 114', a fuse 118', a second shorting switch 120' and the sensor 128 having output 142" with signal 140", as shown.

Figure 3:
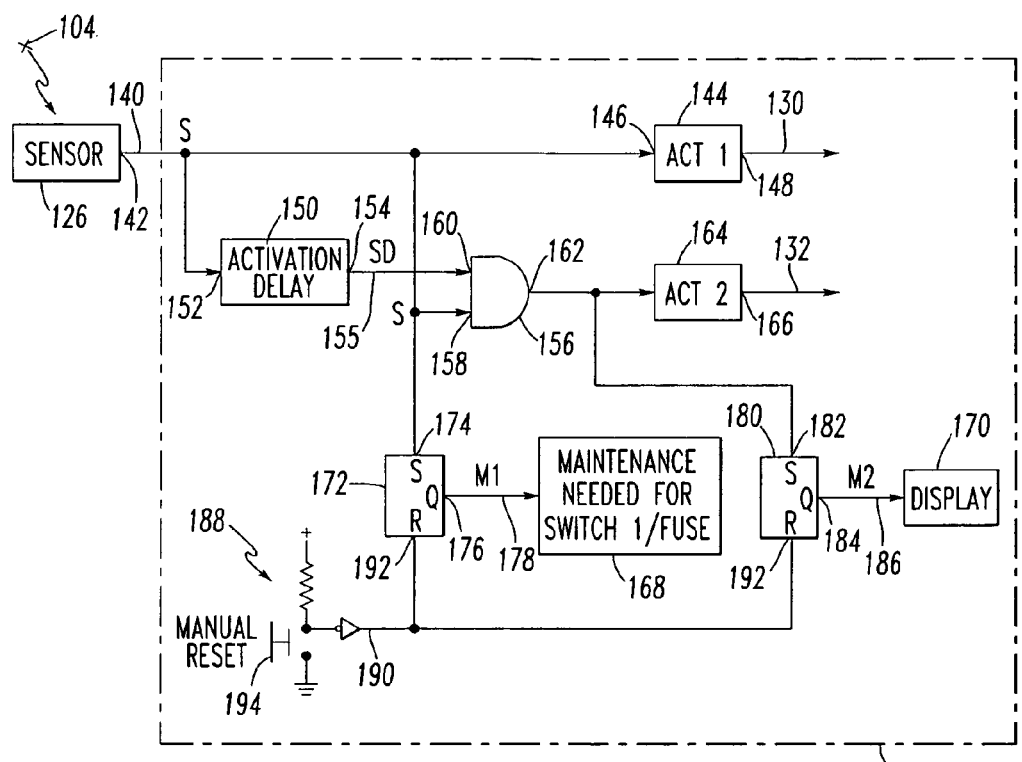
FIG. 3 is a block diagram in schematic form of a control circuit for the arcing fault light sensor and shorting switches of FIG. 2.

Referring to FIG. 3, a control circuit 138 for the detection circuit 124 of FIG. 2 is shown. A sensor, such as 126 of FIG. 2, is adapted to detect arc light from an arcing fault, such as 104 of FIG. 2, and responsively output a signal (S) 140 at output 142. The circuit 138 includes a first actuator (ACT 1) 144 having an input 146 for the sensor output 142 and an output 148 providing the first signal 130 to the input 116 of the first shorting switch 114. The circuit 138 also includes a suitable activation time delay 150 having an input 152 for the signal (S) 140 and an output 154 with a suitable signal (SD) 155 responsive to the signal 140 after the predetermined time. Preferably, the signal 140 is not delayed in time, but a suitable activation pulse 199 of sufficient duration is provided, in order that the signal 140 is sampled after the delay time 198 of FIG. 4. An AND gate 156 includes a first input 158, which is electrically connected to the time delay input 152, a second input 160, which is electrically connected to the time delay output 154, and an output 162. A second actuator (ACT 2) 164 includes an output 166 having the second signal 132 responsive to the AND gate output 162. In response to the second signal 132, the second shorting switch 120 is closed to eliminate the arcing fault 104 when the fuse 118 is open.

In this example, the circuit 138 includes two displays 168,170, which show when maintenance is needed for the two shorting switches 114,120, respectively. A first flip-flop 172 includes a set input (S) 174, which sets output (Q) 176 whenever the sensor output 142 is active. This output 176 has a signal (M1) 178, which indicates that the separable contacts 134 of the first shorting switch 114 are closed and, thus, that this switch needs maintenance (e.g., to repair or replace that switch). A second flip-flop 180 includes a set input (S) 182, which sets output (Q) 184 whenever the AND gate output 162 is active. This output 184 has a signal (M2) 186, which indicates that the separable contacts 134 of the second shorting switch 120 are closed and, thus, that this switch needs maintenance (e.g., to repair or replace that switch). A suitable reset circuit 188 provides a reset signal 190 to the reset input (R) 192 of each of the flip-flops 172,180, whenever an input, such as manual pushbutton 194 is depressed.

The warning signals, M1 178 and/or M2 186, are suitably displayed and/or sent out, in order to alert personnel of the arcing fault(s) and the need to provide maintenance to first shorting switch 114 and fuse 118 and/or the second shorting switch 120, and any associated internal arcing fault cleanup, if needed.

Figure 4:
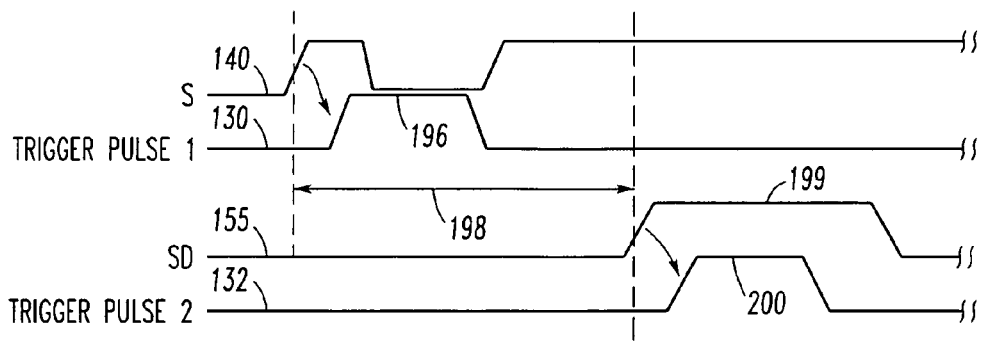
FIGS. 4 and 5 are timing diagrams for the control circuit of FIG. 3.
Figure 5:
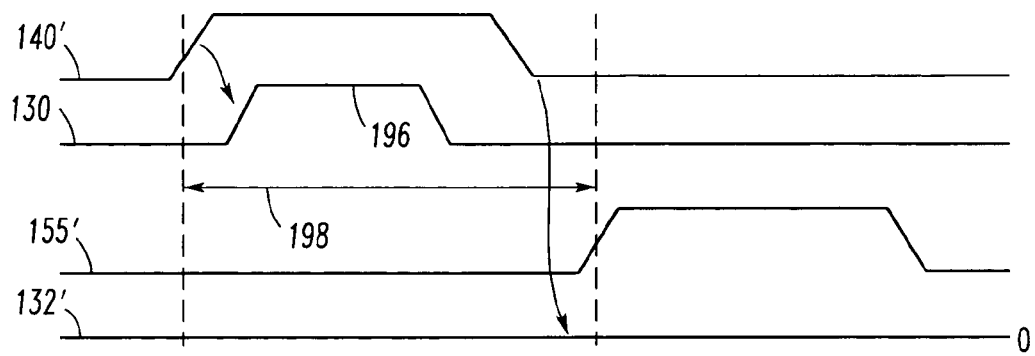

FIGS. 4 and 5 are timing diagrams for the control circuit 138 of FIG. 3. In FIG. 4, the arcing fault 104 of FIG. 2 is persistent. The signal 140 shows that such arcing fault is extinguished by the first shorting switch 114 in response to trigger pulse 196 (which is relatively long for convenience of illustration) before reoccurring prior to the expiration of the predetermined time 198. In turn, the signal (SD) 155 causes the second trigger pulse 200, which is applied to the second shorting switch 120, in order to clear the persistent arcing fault 104.

In FIG. 5, the arcing fault 104 of FIG. 2 is not persistent. The signal 140' shows that such arcing fault is extinguished by the first shorting switch 114 in response to trigger pulse 196 (which, again, is relatively long for convenience of illustration). In turn, the signal 155', which is similar to the signal 155 of FIG. 4, is responsive to the signal 140'. Here, however, since the input 158 of the AND gate 156 is low after the predetermined delay 198, there is no second trigger pulse and, thus, the signal 132' remains low, since there is no need to actuate the second shorting switch 120.

Figure 1:
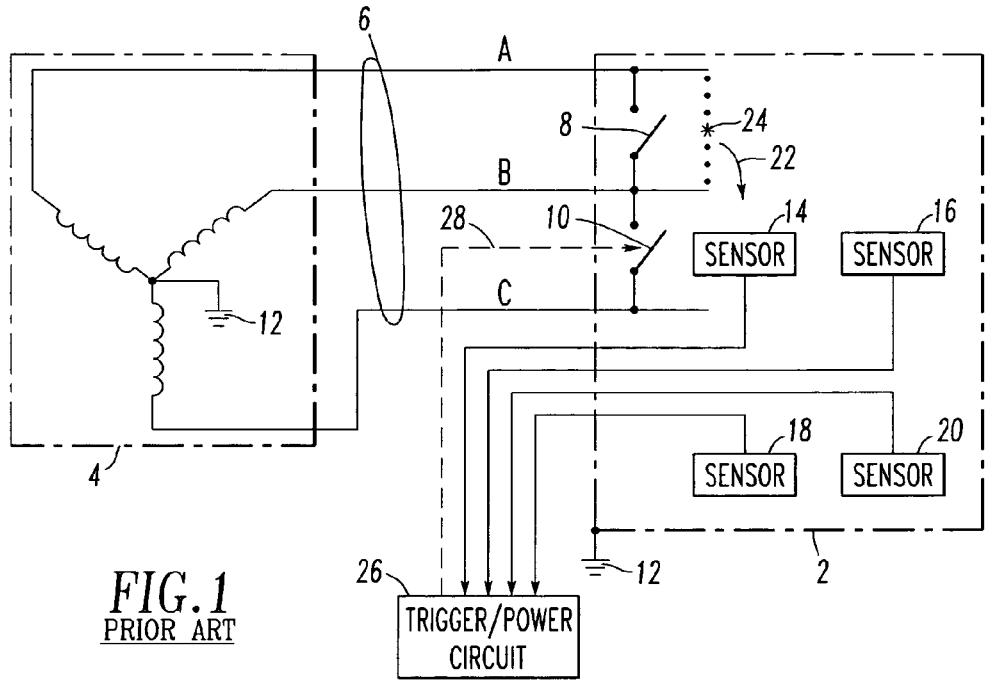
FIG. 1 is a block diagram of an arcing fault light sensor configuration for switchgear.
Figure 6:
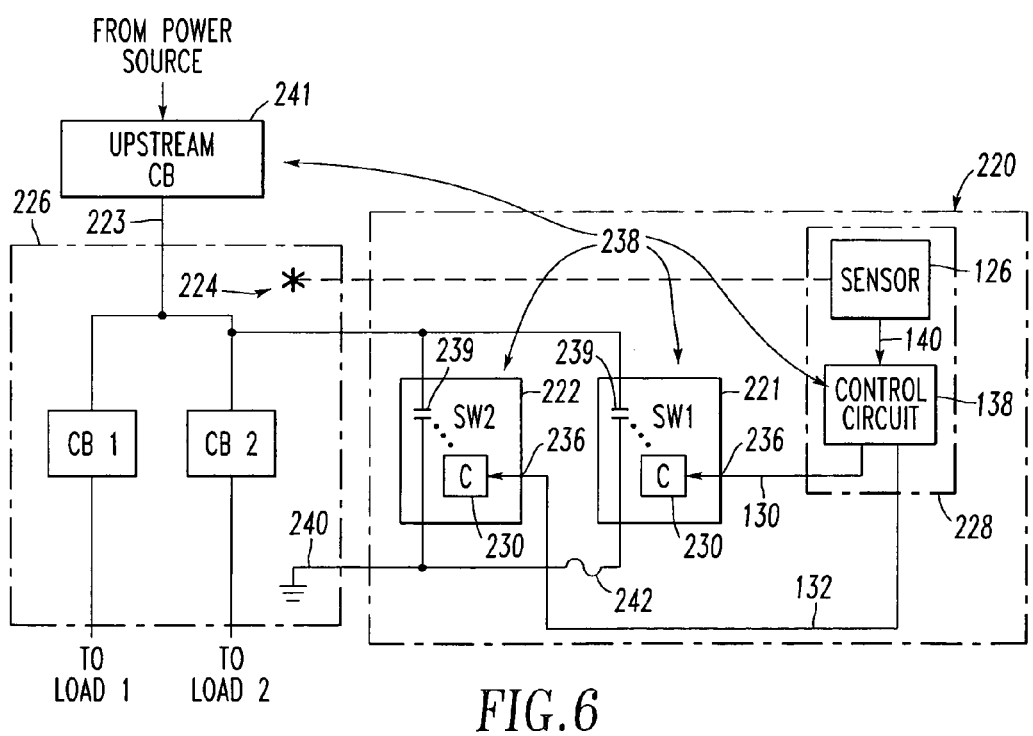
FIG. 6 is a block diagram of an arcing fault light sensor and shorting switch configuration in accordance with another embodiment of the invention.

FIG. 6 shows a shorting switch system 220 including the arcing fault light sensor 126 and one or more pairs of shorting switches 221,222 (only one pair is shown in FIG. 6). Examples of such shorting switches are disclosed in U.S. Pat. Nos. 6,633,009; and 6,657,150, which are incorporated by reference herein. Although example shorting switches 221,222 are shown, any suitable shorting switch may be employed. The system 220 protects an electric power system power bus 223 from and eliminates arcing faults, such as 224, in low or medium voltage power distribution equipment 226. The system 220 also includes a detection and activation circuit 228 for detecting the arcing fault 224 and responsively activating one or both of the operating mechanisms, such as the shorting switch charges (C) 230, in order that the activated charge 230 closes the corresponding switch 221,222, as disclosed in U.S. Pat. Nos. 6,633,009 and 6,657,150. The sensor 126 outputs the arcing detection signal 140, which is employed by the control circuit 138 to responsively output the trigger signals 130,132 to the electrical inputs 236 of the charges 230.

A circuit 238 for removing power from the power bus 223 in response to the arcing fault 224 includes the circuit 138, the shorting switches 221,222, which fault the bus 223 with a shorting member 239 to ground or neutral 240 in response to the arcing signal 140 and the trigger signals 130,132, and an upstream circuit breaker (CB) 241, which removes power from the bus 223 in response to detection of overcurrent in the faulted bus. A fuse 242 is electrically connected in series with the shorting member 239 of the shorting switch 221.

Although one sensor 126 is shown, a plurality of different sensors (not shown) may be employed.

Figure 7:
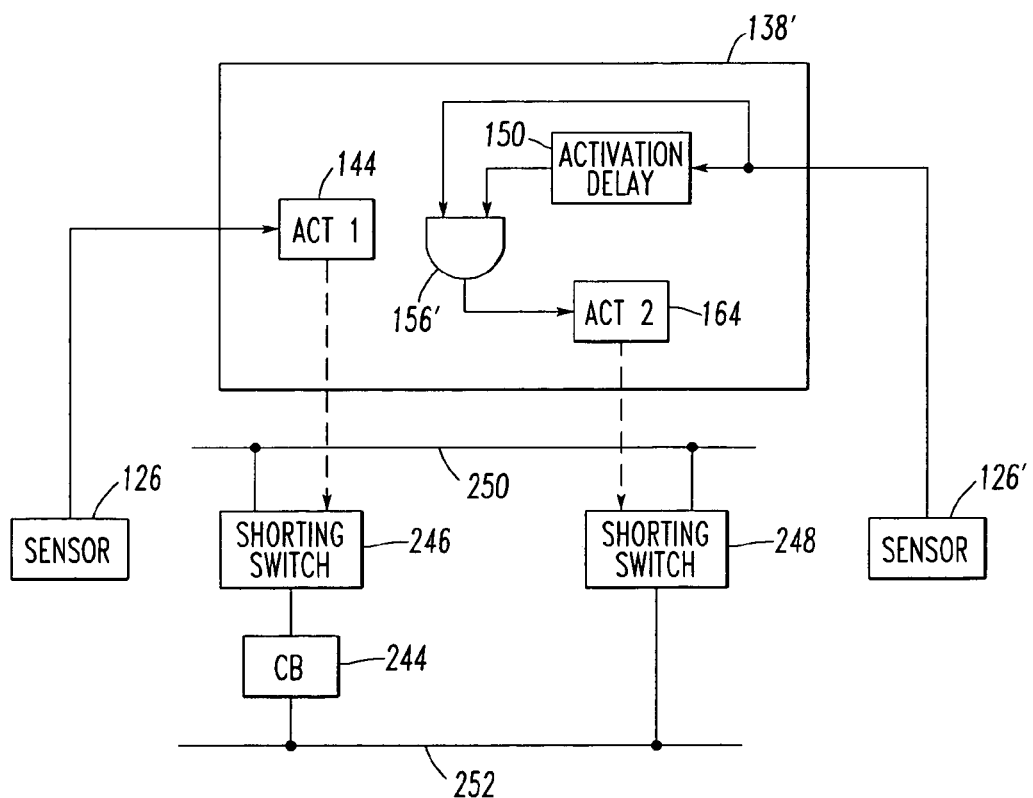
FIG. 7 is a block diagram of a shorting switch and circuit interrupter configuration in accordance with another embodiment of the invention.

Although fuses 118 and 242 are disclosed in FIGS. 2 and 6, respectively, any suitable circuit interrupter, such as circuit breaker (CB) 244 of FIG. 7 may be employed in combination with two shorting switches, such as 246,248, between two power distribution system conductors 250,252. Here, the control circuit 138' is similar to the control circuit 138 of FIG. 3, except that AND gate 156' is responsive to the activation time delay 150 and to a separate sensor 126'. In this manner, a faulty sensor, such as 126, would not disable the power distribution system conductors 250,252.

Although the circuits 138,138' implement the activation time delay 150 and associated logic in digital logic, it will be appreciated that a combination of one or more of analog, digital and/or processor-based circuits may be employed.

While for clarity of disclosure reference has been made herein to the exemplary displays 168,170 for displaying maintenance information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for eliminating an arcing fault of power distribution equipment, said system comprising:
    a first switch including a first input;
    a circuit interrupter electrically connected in series with said first switch;
    a second switch including a second input, said second switch being electrically connected in parallel with the series combination of said first switch and said circuit interrupter;
    a circuit adapted to detect said arcing fault and responsively output a first signal to the first input of said first switch to close said first switch and, also, responsively output after a predetermined time a second signal to the second input of said second switch to close said second switch; and
    wherein said circuit interrupter includes a closed state and an open state; wherein said first switch is adapted to close in order to eliminate said arcing fault when said circuit interrupter is in the closed state; wherein said arcing fault is a persistent arcing fault; and wherein said second switch is adapted to close to eliminate said persistent arcing fault after said circuit interrupter is in the open state and after said predetermined time.

2. The system of claim 1 wherein said power distribution equipment includes two power lines; and wherein said second switch is adapted for electrical connection to said power lines.

3. The system of claim 1 wherein said power distribution equipment includes a power line and a ground or neutral; and wherein said second switch is adapted for electrical connection to said power line and said ground or neutral.

4. The system of claim 1 wherein said power distribution equipment includes a first power line and a second power line; and wherein said second switch is adapted for electrical connection between said first power line and said second power line.

5. The system of claim 1 wherein said first switch and said second switch are shorting switches each of which comprises separable contacts and an operating mechanism including a closed state; and wherein one of said first input and said second input actuates said operating mechanism and moves said operating mechanism to said closed state.

6. The system of claim 1 wherein said circuit interrupter is a fuse.

7. The system of claim 1 wherein said circuit comprises one sensor, which is adapted to detect arc light from said arcing fault.

8. The system of claim 1 wherein said circuit comprises a plurality of sensors each of which is adapted to detect arc light from said arcing fault.

9. The system of claim 1 wherein said arcing fault persists for greater than said predetermined time or is temporarily eliminated by said first switch before reoccurring before said predetermined time.

10. A shorting system for eliminating an arcing fault between a first conductor and a second conductor of a power distribution system, said shorting system comprising:
 a first shorting switch comprising first separable contacts, a first operating mechanism and a first input to actuate said first operating mechanism to close said first separable contacts;
 a fuse electrically connected in series with the first separable contacts of said first shorting switch;
 a second shorting switch comprising second separable contacts, a second operating mechanism and a second input to actuate said second operating mechanism to close said second separable contacts, said second separable contacts being electrically connected in parallel with the series combination of said first separable contacts and said fuse, the parallel combination of said second separable contacts and the series combination of said first separable contacts and said fuse being adapted for electrical connection between the first and second conductors of said power distribution system; and
 a circuit adapted to detect said arcing fault and responsively output a first signal to the first input of said first shorting switch to close said first shorting switch and, also, responsively output after a predetermined time a second signal to the second input of said second shorting switch to close said second shorting switch.

11. The shorting system of claim 10 wherein said power distribution system is a low voltage power distribution system; and wherein said first and second shorting switches are adapted for operation between the first and second conductors of said low voltage power distribution system.

12. The shorting system of claim 10 wherein said power distribution system is a medium voltage power distribution system; and wherein said first and second shorting switches are adapted for operation between the first and second conductors of said medium voltage power distribution system.

13. The shorting system of claim 10 wherein said power distribution system includes alternating current power having a line cycle period associated with at least one of said first and second conductors; and wherein said predetermined time is about one-half to about two times said line cycle period.

14. The shorting system of claim 10 wherein said circuit includes an arcing light detector having an output and also includes an actuator having an input for the output of said arcing light detector and an output providing the first signal to the first input of said first shorting switch.

15. The shorting system of claim 10 wherein said circuit includes a display displaying that said first separable contacts of said first shorting switch are closed.

16. The shorting system of claim 10 wherein said circuit includes a display displaying that said second separable contacts of said second shorting switch are closed.

17. A power distribution system comprising:
 a first conductor;
 a second conductor;
 a shorting system for eliminating an arcing fault between said first conductor and said second conductor, said shorting system comprising:
  a first shorting switch including a first input,
  a circuit interrupter electrically connected in series with said first shorting switch,
  a second shorting switch including a second input, said second shorting switch being electrically connected in parallel with the series combination of said first shorting switch and said circuit interrupter, and
  a circuit adapted to detect said arcing fault and responsively output a first signal to the first input of said first shorting switch to close said first shorting switch and, also, responsively output after a predetermined time a second signal to the second input of said second shorting switch to close said second shorting switch.

18. The power distribution system of claim 17 wherein said first conductor and said second conductor include alternating current power having a line cycle period associated with at least one of said first and second conductors; and wherein said predetermined time is about one-half to about two times said line cycle period.

19. A system for eliminating an arcing fault of power distribution equipment, said system comprising:
 a first switch including a first input;
 a circuit interrupter electrically connected in series with said first switch;
 a second switch including a second input, said second switch being electrically connected in parallel with the series combination of said first switch and said circuit interrupter;
 a circuit adapted to detect said arcing fault and responsively output a first signal to the first input of said first switch to close said first switch and, also, responsively output after a predetermined time a second signal to the second input of said second switch to close said second switch; and
 wherein said circuit comprises at least one sensor adapted to detect arc light from said arcing fault and responsively output at least one signal; and an actuator including an input for at least one of said at least one signal and an output having said first signal responsive to said at least one of said at least one signal, said first switch being closed to eliminate said arcing fault when said circuit interrupter is also closed.

20. A system for eliminating an arcing fault of power distribution equipment, said system comprising:
 a first switch including a first input;
 a circuit interrupter electrically connected in series with said first switch;
 a second switch including a second input, said second switch being electrically connected in parallel with the series combination of said first switch and said circuit interrupter;
 a circuit adapted to detect said arcing fault and responsively output a first signal to the first input of said first switch to close said first switch and, also, responsively output after a predetermined time a second signal to the second input of said second switch to close said second switch; and
 wherein said circuit comprises a sensor, which is adapted to detect arc light from said arcing fault and responsively output a third signal; and wherein said circuit further comprises an activation time delay having an input for said third signal and an output responsive to said third signal after said predetermined time, an AND gate including a first input, which is electrically connected to the input of said time delay, a second input, which is electrically connected to the output of said time delay, and an output, and an actuator including an output having said second signal responsive to the output of said AND gate, said second switch being closed to eliminate said arcing fault when said circuit interrupter is open.

21. A shorting system for eliminating an arcing fault between a first conductor and a second conductor of a power distribution system, said shorting system comprising:

a first shorting switch comprising first separable contacts, a first operating mechanism and a first input to actuate said first operating mechanism to close said first separable contacts;

a fuse electrically connected in series with the first separable contacts of said first shorting switch;

a second shorting switch comprising second separable contacts, a second operating mechanism and a second input to actuate said second operating mechanism to close said second separable contacts, said second separable contacts being electrically connected in parallel with the series combination of said first separable contacts and said fuse, the parallel combination of said second separable contacts and the series combination of said first separable contacts and said fuse being adapted for electrical connection between the first and second conductors of said power distribution system;

a circuit adapted to detect said arcing fault and responsively output a first signal to the first input of said first shorting switch to close said first shorting switch and, also, responsively output after a predetermined time a second signal to the second input of said second shorting switch to close said second shorting switch; and wherein said circuit includes an arcing light detector having an output with a third signal, an activation time delay having an input for the output of said arcing light detector and an output responsive to said third signal after said predetermined time, an AND gate including a first input, which is electrically connected to the input of said time delay, a second input, which is electrically connected to the output of said time delay, and an output, and an actuator having an input for the output of time delay and an output providing the second signal to the second input of said second shorting switch.

22. A shorting system for eliminating an arcing fault between a first conductor and a second conductor of a power distribution system, said shorting system comprising:

a first shorting switch comprising first separable contacts, a first operating mechanism and a first input to actuate said first operating mechanism to close said first separable contacts;

a fuse electrically connected in series with the first separable contacts of said first shorting switch;

a second shorting switch comprising second separable contacts, a second operating mechanism and a second input to actuate said second operating mechanism to close said second separable contacts, said second separable contacts being electrically connected in parallel with the series combination of said first separable contacts and said fuse, the parallel combination of said second separable contacts and the series combination of said first separable contacts and said fuse being adapted for electrical connection between the first and second conductors of said power distribution system;

a circuit adapted to detect said arcing fault and responsively output a first signal to the first input of said first shorting switch to close said first shorting switch and, also, responsively output after a predetermined time a second signal to the second input of said second shorting switch to close said second shorting switch; and wherein said circuit includes a first arcing light detector having an output, a first actuator having an input for the output of said first arcing light detector and an output providing the first signal to the first input of said first shorting switch, a second arcing light detector having an output with a third signal, an activation time delay having an input for the output of said second arcing light detector and an output responsive to said third signal after said predetermined time, an AND gate including a first input, which is electrically connected to the input of said time delay, a second input, which is electrically connected to the output of said time delay, and an output, and a second actuator having an input for the output of time delay and an output providing the second signal to the second input of said second shorting switch.

* * * * *